(12) United States Patent  (10) Patent No.: US 8,823,423 B2
Pennisi                     (45) Date of Patent:     Sep. 2, 2014

(54) WIRELESS TACHOMETER RECEIVER

(71) Applicant: Terry Pennisi, Oak Ridge, TN (US)

(72) Inventor: Terry Pennisi, Oak Ridge, TN (US)

(*) Notice: Subject to any disclaimer, the term of this patent is extended or adjusted under 35 U.S.C. 154(b) by 0 days.

(21) Appl. No.: 13/872,293

(22) Filed: Apr. 29, 2013

(65) Prior Publication Data
US 2013/0285707 A1 Oct. 31, 2013

Related U.S. Application Data

(60) Provisional application No. 61/640,108, filed on Apr. 30, 2012, provisional application No. 61/783,202, filed on Mar. 14, 2013.

(51) Int. Cl.
H03B 1/00 (2006.01)
H03K 3/00 (2006.01)
H03K 5/003 (2006.01)
G08C 17/00 (2006.01)
H04B 1/04 (2006.01)
H02J 7/00 (2006.01)

(52) U.S. Cl.
CPC ............ G08C 17/00 (2013.01); H03K 5/003 (2013.01); H04B 1/04 (2013.01); H02J 7/0052 (2013.01)
USPC ........ 327/108; 327/109; 327/112; 455/127.1; 455/131; 340/441

(58) Field of Classification Search
CPC ............ H04B 1/04; H03K 5/00; G07C 5/008
USPC ............... 327/108, 109, 112; 455/127.1, 131; 340/441
See application file for complete search history.

(56) References Cited

U.S. PATENT DOCUMENTS

| | | |
|---|---|---|
| 3,704,445 A | 11/1972 | Lanham |
| 3,887,273 A | 6/1975 | Griffiths |
| 4,298,893 A | 11/1981 | Holmes |
| 4,600,271 A | 7/1986 | Boyer et al. |
| 4,711,544 A | 12/1987 | Iino et al. |
| 4,788,497 A | 11/1988 | Katsumura |
| 4,831,366 A | 5/1989 | Iino |
| 4,868,652 A | 9/1989 | Nutton |
| 4,925,272 A | 5/1990 | Ohshima et al. |
| 4,972,122 A | 11/1990 | Daidouji et al. |
| 4,988,976 A | 1/1991 | Lu |
| 5,013,134 A | 5/1991 | Smith |

(Continued)

FOREIGN PATENT DOCUMENTS

WO  WO 2009/089225  7/2009

Primary Examiner — John Poos
(74) Attorney, Agent, or Firm — Knox Patents; Thomas A. Kulaga

(57) ABSTRACT

Apparatus for a wireless tachometer receiver. The wireless tachometer receiver includes a receiver and a signal conditioner that drives a conventional tachometer. Conventional tachometers require an input consisting of pulses at the operating voltage of the vehicle, which is typically 12 Vdc. Conventional receivers have an alternating current output that is substantially less than the operating voltage of the vehicle, which is insufficient to trigger the tachometer reliably. The signal conditioner converts the receiver output to a signal that allows for reliable operation of the conventional tachometer. In one embodiment, the signal conditioner is an amplifier that has a gain to drive the amplifier output between zero and the operating voltage of the vehicle. In another embodiment, the signal conditioner is a step-up transformer that has a ratio sufficient to produce an output at the operating voltage of the vehicle.

17 Claims, 4 Drawing Sheets

(56) References Cited

U.S. PATENT DOCUMENTS

| | | |
|---|---|---|
| 5,202,668 A | 4/1993 | Nagami |
| 5,584,561 A | 12/1996 | Lahos |
| 5,721,539 A | 2/1998 | Goetzl |
| 5,825,338 A | 10/1998 | Salmon et al. |
| 6,244,988 B1 | 6/2001 | Delman |
| 6,992,413 B2 | 1/2006 | Endo et al. |
| 7,060,343 B2 | 6/2006 | Freeman |
| 7,061,228 B2 | 6/2006 | Ichida et al. |
| 7,165,641 B2 | 1/2007 | Kitamura |
| 7,253,610 B2 | 8/2007 | Nagae |
| 7,363,806 B2 | 4/2008 | Huang |
| 7,379,798 B2 | 5/2008 | Takeda et al. |
| 7,408,447 B2 | 8/2008 | Watson |
| 8,035,498 B2 | 10/2011 | Pennisi |
| 2004/0092238 A1* | 5/2004 | Filipovic ................ 455/131 |
| 2005/0156590 A1 | 7/2005 | Nagae |
| 2008/0042816 A1* | 2/2008 | Pennisi et al. ............ 340/441 |

* cited by examiner

WIRELESS TACHOMETER RECEIVER

CROSS-REFERENCE TO RELATED APPLICATIONS

This application claims the benefit of U.S. Provisional Application No. 61/640,108, filed Apr. 30, 2012, and U.S. Provisional Application No. 61/783,202, filed Mar. 14, 2013.

STATEMENT REGARDING FEDERALLY SPONSORED RESEARCH OR DEVELOPMENT

Not Applicable

BACKGROUND

This invention pertains to a wireless tachometer receiver. More particularly, this invention pertains to a receiver circuit responsive to a wireless pulse signal that includes a signal conditioner driving a conventional wired vehicle tachometer.

DESCRIPTION OF THE RELATED ART

As automobiles become more complex and automated, the numbers of electrical connections increase along with the amount of wiring. The electrical wiring of a vehicle often makes assembly more difficult and often creates issues with respect to reliability and maintenance. For factory installed tachometers, wiring is installed from the electronic fuel injection or ignition control in the engine compartment to the tachometer mounted in the dashboard. For custom or aftermarket tachometers, new wiring must be installed. The wiring includes power and the tachometer signal. The wiring for the tachometer signal is routed from the engine compartment, through the firewall, and into the passenger compartment to where the tachometer is located.

BRIEF SUMMARY

According to one embodiment of the present invention, a wireless tachometer receiver includes a receiver and a signal conditioner that drives a conventional tachometer. The entire wireless tachometer system includes a transmitter, a receiver, a signal conditioner, and a conventional tachometer. The transmitter sends a wireless signal corresponding to a rotational speed of a device, such as the engine in a vehicle. The receiver is responsive to the wireless signal and the signal conditioner converts the output of the receiver to a signal that is suitable for a conventional tachometer.

Conventional tachometers require an input consisting of pulses at the operating voltage of the vehicle, which is typically 12 Vdc. The pulse rate corresponds to a rotational speed of the engine. Conventional receivers have an alternating current output that varies a maximum of one-half of the operating voltage of the vehicle. Also, receivers have an output level based on the received signal. For amplitude modulated signals, the output is proportional to the input signal strength, which further reduces the output level from the receiver to much less than the operating voltage of the vehicle. The signal conditioner converts the receiver output to a signal compatible with the input requirements for the conventional tachometer, which allows for reliable operation of the conventional tachometer.

In one embodiment, the signal conditioner is an amplifier that has a gain to drive the amplifier output between zero and the operating voltage of the vehicle. The signal conditioner includes an operational amplifier. The receiver output is connected to the positive or non-inverting input connection of the operational amplifier. The output of the operational amplifier is connected to the input of the conventional tachometer. The gain of the operational amplifier is set so that the output is at the operating voltage of the vehicle when a pulse is received by the receiver. In one such embodiment, the operational amplifier functions as a comparator with the gain set to minimize overdriving the operational amplifier while avoiding saturation.

In another embodiment, the signal conditioner is a step-up transformer that has a ratio sufficient to produce an output at the operating voltage of the vehicle. The output of the conventional receiver is an alternating current (ac) signal. The transformer steps up the receiver output voltage to a level that ensures reliable operation of the conventional tachometer. In one such embodiment, the gain of the receiver is set or adjusted so that the output of the transformer is at or near the operating voltage of the vehicle. In another such embodiment, the turns ratio of the transformer is selected such that the output of the transformer is at or near the operating voltage of the vehicle considering the output of the receiver. For installations where the transmitted signal strength is fixed and with a receiver having a fixed gain, the transformer ratio is selected to provide an output that is greater than the minimum voltage requirement of the tachometer and less than the saturation or maximum voltage of the tachometer.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Apparatus for a wireless tachometer system 60 is disclosed. The wireless tachometer system 60 enables a conventional tachometer 608 to operate based on a wireless signal, such as transmitted by a single sensor burst transmitter system 10 or other wireless transmitter.

Figure 1:
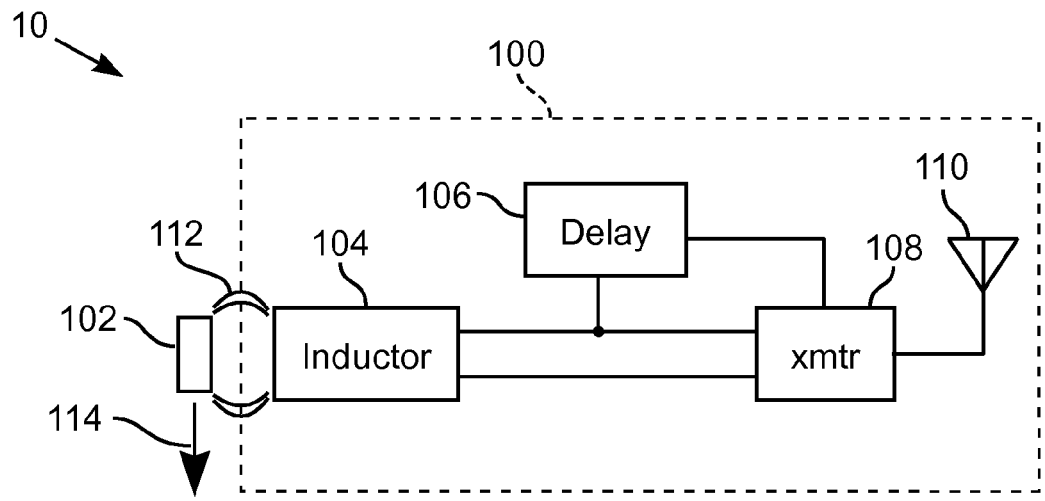
FIG. 1 is a functional block diagram of one embodiment of a single sensor burst transmitter system.

FIG. 1 illustrates a functional block diagram of one embodiment of a single sensor burst transmitter system 10. The system 10 includes a magnet 102 and a burst transmitter 100. The magnet 102, in one embodiment, is attached to a moving object such that the magnet 102 periodically moves past the burst transmitter 100. The burst transmitter 100 interacts with the magnet 102 and transmits a pulse 306 each time the magnet 102 passes by the burst transmitter 100.

The burst transmitter 100 includes an inductor 104, a delay 106, and a transmitter 108 that is connected to an antenna 110. The magnetic field 112 of the magnet 102 engages the inductor 104 when the magnet 102 moves past the inductor 104. The magnetic field 112 of the magnet 102 interacts with the inductor 104 and induces a pulse 302 in the inductor 104.

The magnet 102 is secured to a part of a machine that moves in at least one direction 114 relative to the inductor 104 in the burst transmitter 100. The magnet 102, through the magnetic field interaction with the burst transmitter 100, provides the energy that powers the burst transmitter 100. Also, the magnet 102 triggers the burst transmitter 100 to transmit the signal 306 when the magnet 102 is proximate the inductor 104. Although the illustrated embodiment depicts the magnet 102 as moving in direction 114, it is the relative motion between the magnet 102 and the inductor 104 that is relevant. For example, in another embodiment, the burst transmitter 100 is attached to the moving component and the magnet 102 is stationary.

The magnet 102 is dimensioned relative to the moving part of the machine such that the magnetic field 112 is substantially a point source that engages the inductor 104 for a shorter duration than the duration when the magnetic field 112 does not engage the inductor 104. That is, the interaction of the magnetic field 112 with the inductor 104 occurs briefly compared to the long dwell time with no interaction by the magnetic field 112. The interaction of the magnetic field 112 occurs during an interaction interval, which can be expressed in units of time or angular displacement. The dwell interval refers to the time or angular displacement where the magnetic field 112 does not interact with the inductor 104. For those embodiments where a magnet 102 is attached to a moving component of a machine, the magnet 102 will be substantially smaller than the moving component in order to minimize the mass added to the moving component and to minimize any unbalancing effect from the addition of the magnet 102. Typically, the ratio of the interaction interval to the dwell interval will be about 1:10 or less. For example, in one embodiment, the magnet 102 is cylindrical and less than ½ inch in diameter. The magnet 102 is attached to a rotating pulley that is six inches in diameter. In this example the interaction interval is approximately 10 degrees or less and the dwell interval is approximately 350 degrees or more, which results in the ratio of the interaction interval to the dwell interval of 10:350.

The magnet 102 is attached to a moving component that moves in a cyclical or repetitive manner such that the magnet 102 repeatedly moves proximate the inductor 104 at an interval that corresponds to some variable to be measured, such as revolutions per minute (RPM). For example, in one embodiment, the magnet 102 is attached to a shaft of a pump or motor. The magnet 102 moves in direction 114 as the shaft rotates. The rate of interactions of a single magnet 102 on the shaft with the inductor 104 provides data on the rotational speed of the shaft. One interaction between the magnet 102 and inductor 104 corresponds to one revolution of the shaft.

For slower moving devices, multiple magnets 102 are spaced at regular intervals and an appropriate scaling factor is applied to the sensed rate of interactions to determine the rate of movement. For example, a plurality of magnets 102 are attached to a conveyor belt at regular intervals to measure the speed of the conveyor belt. Each time a magnet 102 moves proximate the inductor 104 the burst transmitter 100 transmits a pulse 306. Either the time difference between pulses 306 or the number of pulses 306 per unit of time are used to determine the speed of the conveyor belt.

The inductor 104 is responsive to the magnetic field 112 of the magnet 102. The leads of the inductor 104 are connected to the transmitter 108. The interaction of the magnetic field 112 of the magnet 102 with the inductor 104 causes the inductor 104 to generate a pulse 302 that sets the trigger Tr of the transmitter 108.

The delay 106 is connected between the reference or ground Ref of the transmitter 108 and the supply voltage Vcc connection of the transmitter 108. The delay 106 adds a short time delay to the pulse 302 from the inductor 104.

The transmitter 108 is a device that transmits a wireless signal through an antenna 110. In one embodiment, the transmitter unit 108 causes a wireless radio frequency (RF) signal to be sent from the antenna 110. The transmitter unit 108 is both powered and triggered by the magnetic field 112 of the magnet 102 interacting with the inductor 104. When multiple single sensor burst transmitter systems 10 are used within range of a single receiver, the transmitters 108 are configured to minimize or reduce interference. For example, in one embodiment, each transmitter 108 operates at a specific frequency or channel different from other transmitters 108.

Figure 2:
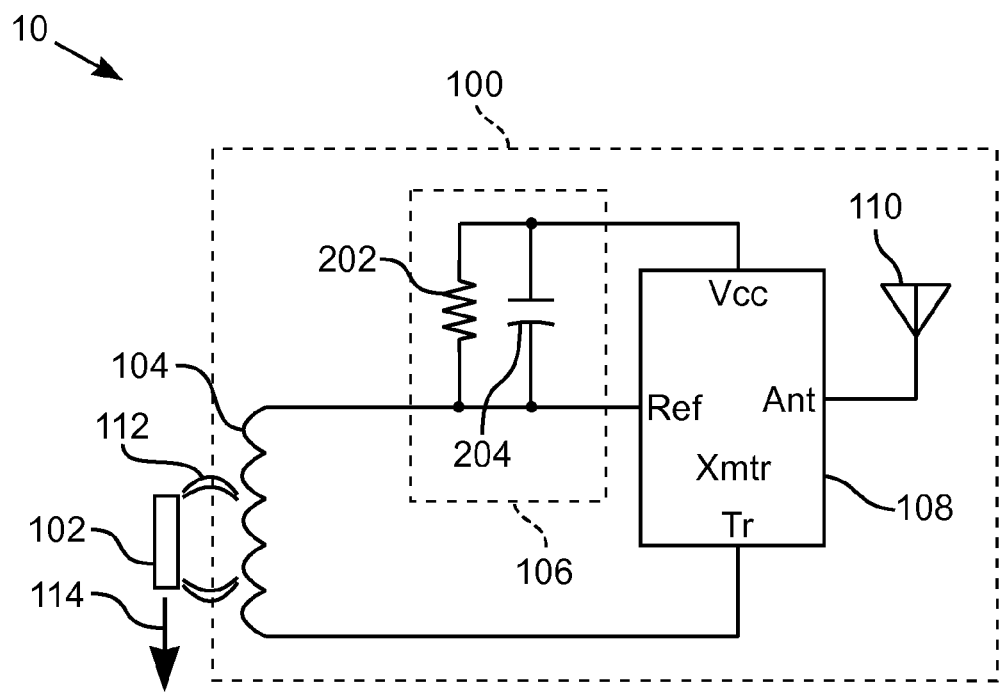
FIG. 2 is a schematic diagram of one embodiment of a single sensor burst transmitter system.

FIG. 2 illustrates a schematic diagram of one embodiment of a single sensor burst transmitter system 10. The illustrated embodiment of the transmitter system 10 includes a magnet 102 and a burst transmitter 100. The burst transmitter 100 includes an inductor 104, a delay circuit 106, a transmitter 108, and an antenna 110.

In one embodiment, the magnet 102 is secured to a moving part of a machine. The magnet 102 moves in a direction 114 relative to the inductor 104. Because the magnet 102 adds mass to the moving part, the magnet 102 in one embodiment is a rare earth magnet, which ensures the size is minimized and the magnetic field generated is as strong as possible relative to the size of the magnet 102. In another embodiment, the burst transmitter 100 is secured to the moving part of the machine and the magnet 102 is stationary.

The inductor 104 is a coil that is responsive to the magnetic field 112 of the magnet 102. In various embodiments, the inductor 104 is an air wound coil or a cored inductor. The inductor 104 is oriented such that the magnetic field 112 passing through the inductor 104 generates sufficient power to drive the transmitter 108.

The delay 106 includes an RC circuit with a resistor 202 and capacitor 204 connected in parallel. The RC circuit 106 is connected between the reference, common, or ground Ref of the transmitter 108 and the supply voltage Vcc connection of the transmitter 108. The delay circuit 106 adds a short delay to the voltage generated by the inductor 104 and applies that delayed signal 304 to the supply voltage Vcc connection of the transmitter unit 108. The values for the resistor 202 and the capacitor 204 in the RC circuit 106 are selected such that the voltage across the capacitor 204 falls below the minimum required Vcc voltage 312 within the period 324 between trigger pulses 304. That is, the time to drain the capacitor 204 is less than the period 324 being measured.

The transmitter 108 is a low power device with a fast response time that is operable with the amount of power generated by the magnet 102 moving relative to the inductor 104. The transmitter 108 has a trigger input Tr that causes the transmitter 108 to output a signal from the antenna output ANT to the antenna 110 when the trigger input Tr is at or above a trigger voltage 312. In various embodiments, the antenna 110 is an external or built-in antenna operating at the frequency of the transmitter 108.

In one example, the transmitter 108 is an amplitude modulated (AM) hybrid transmitter unit, such as the Model AM-RT4-315 sold by RF Solutions. The transmitter unit 108 is a complete, self-contained RF transmitter that supports a transmitted data rate up to about 4 kHz. The transmitter unit 108 requires a supply voltage (Vcc) of between 2 and 14 volts dc with a typical supply current of 4 mA at 5 Vdc. The minimum input level is 2 volts dc with a maximum equal to Vcc. The transmitter unit 108 operates at a fixed frequency of 315 MHz with a range up to 70 meters. The transmitter unit 108 has four leads: supply voltage Vcc, reference or ground Ref, trigger input Tr, and output for an external antenna Ant. The transmitter unit 108 has an equivalent circuit capacitance of 1 nF between the trigger input Tr and the supply voltage Vcc connections, and an equivalent circuit capacitance of 100 pF between the ground Ref and the trigger input Tr connections and between the ground Ref and the supply voltage Vcc connections.

In such an example, the supply voltage Vcc signal 304 is delayed approximately 0.6 milliseconds relative to the signal 302 applied to the trigger input Tr of the transmitter unit 108. Such a delay is sufficient to ensure that the transmitter unit 108 transmits a signal 306 as soon as the supply voltage Vcc signal 304 is at a level sufficient to power the transmitter unit 108. That is, with the trigger input Tr at a voltage at or above the required trigger voltage 312, the transmitter 108 outputs a signal as soon as the Vcc voltage reaches the minimum required Vcc voltage 314. With the transmitter unit 108 in this example, the minimum trigger input Tr and the minimum supply voltage Vcc are the same, which is 2 volts. In the tested embodiment, the magnet 102 and inductor 104 combination produce a spike of 2.8 volts, which is sufficient to operate the transmitter unit 108.

FIG. 2 illustrates a simplified schematic of one embodiment of a single sensor burst transmitter system 10. The simplified schematic does not illustrate various connections that may be required to accommodate specific components selected, for example, the transmitter unit 108 may require a crystal or other frequency selection circuitry. An antenna tuning or matching circuit may also be needed depending upon the components selected. Those skilled in the art will recognize the need for such wiring and understand how to wire such a circuit, based on the components ultimately selected for use.

Figure 3A:
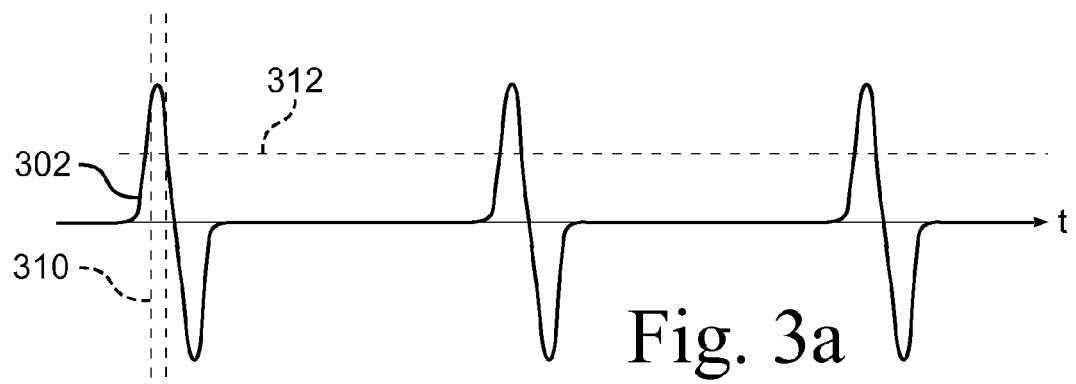
FIG. 3a is a diagram showing the trigger signal applied to the transmitter unit over time.
Figure 3B:
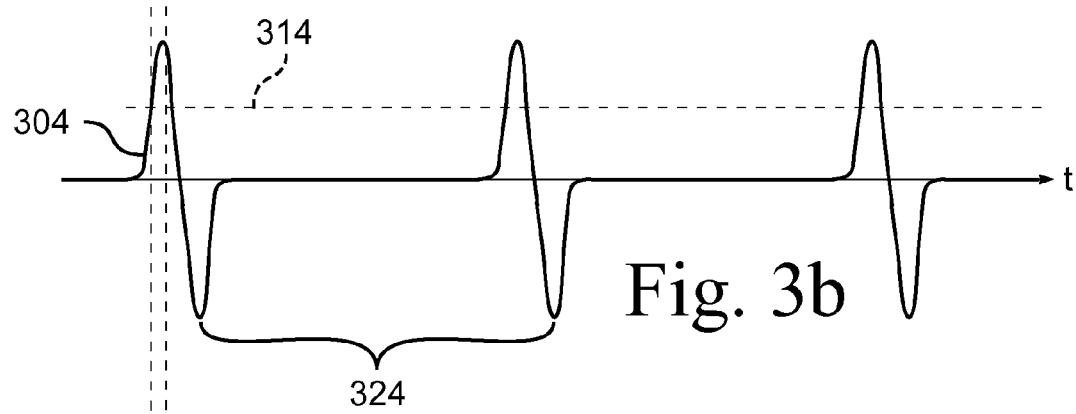
FIG. 3b is a diagram showing the Vcc voltage applied to the transmitter unit over time.
Figure 3C:
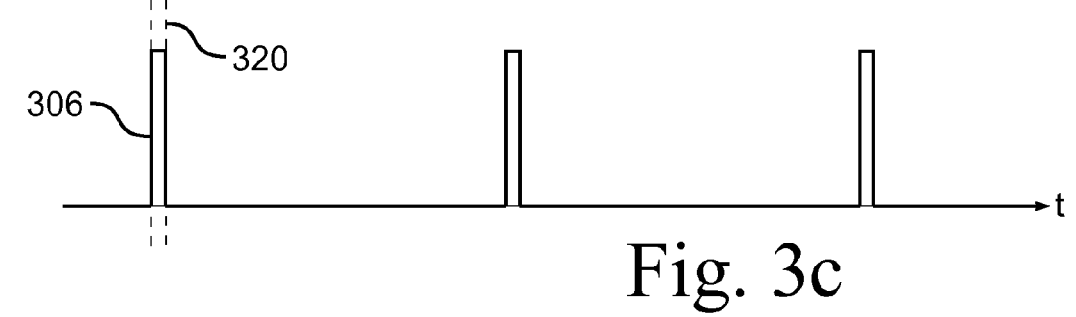
FIG. 3c is a diagram showing the pulse signal sent to the antenna over time.

FIG. 3a illustrates a diagram showing the trigger signal 302 applied to the transmitter unit 108 over time t. FIG. 3b illustrates a diagram showing the Vcc voltage 304 applied to the transmitter unit 108 over time t. FIG. 3c illustrates a diagram showing the output pulse signal 306 sent to the antenna 110 over time t. The output pulse 306 is a signal at the frequency of the transmitter unit 306, which is much greater than the frequency of magnet 102-inductor 104 interactions. The output pulse 306 is shown as a square wave because of the magnitude of the frequency difference. The diagrams also illustrate the periodic nature of the signals that correspond to the rate of interaction between the magnet 102 and the inductor 104. In the illustrated embodiment, the period 324 between spikes or pulses 302, 304, 306 is regular.

The inductor 104 generates a voltage spike 302 from the interaction of the magnetic field 112 of the magnet 102 as it moves by the inductor 104. The inductor 104 is connected between the reference or ground Ref and the trigger input Tr of the transmitter 108 such that the voltage at the trigger input Tr is positive relative to ground Ref. The trigger spike 302 has a maximum voltage that is equal to or greater than the minimum required trigger voltage 312 at the time 310 the output pulse 306 begins. The minimum required trigger voltage 312 is the voltage level required by the trigger input Tr of the transmitter 108 to send a signal.

The delay circuit 106 is connected between the reference or ground Ref and the supply voltage Vcc connections of the transmitter 108. The RC circuit 106 adds a short delay to the voltage spike 302 from the inductor 104 such that the supply voltage 304 reaches a level 310 sufficient to power the transmitter 108 after the trigger input Tr has reached a sufficient level to trigger the transmitter 108 to send a pulse 306. The minimum required Vcc level 314 is the voltage level required by the transmitter 108 to be energized and operable.

The Vcc voltage 304 enables the transmitter 108 to operate when the Vcc voltage 304 reaches the minimum required Vcc voltage 314 at time 310. A first vertical line 310 shows the relationship between when the Vcc voltage 304 reaches the minimum required Vcc voltage 314 and the other signals 302, 306.

Referring to FIG. 3a, the trigger spike 302 has a voltage that is equal to or greater than the minimum required trigger voltage 312 at the time 310 the Vcc voltage 304 reaches the minimum required Vcc voltage 314. Because these two conditions are met (trigger voltage 302 at or greater than minimum trigger voltage 312 and Vcc voltage 304 at or greater than minimum required Vcc voltage 324), the transmitter unit 108 sends an output pulse 306 starting at time 310.

The second vertical line 320 shows the relationship between when the trigger signal 302 falls below the minimum required trigger voltage 312 and the other signals 304, 306. The output pulse 306 ends at the time 320 when the trigger signal 302 falls below the minimum required trigger voltage 312 or the Vcc voltage 304 falls below the minimum required Vcc voltage 314, whichever occurs first. In the illustrated diagrams, the output pulse 306 stop time 320 occurs when the trigger signal 302 falls below the minimum required trigger voltage 312. The time width of the Vcc voltage signal 304 at the minimum required Vcc voltage 324, minus the amount of time delay introduced by the RC circuit 106, determines the width of the output pulse 306. That is, the width of the pulse 306 is the time between the pulse start time 310 and end time 320.

Figure 4:
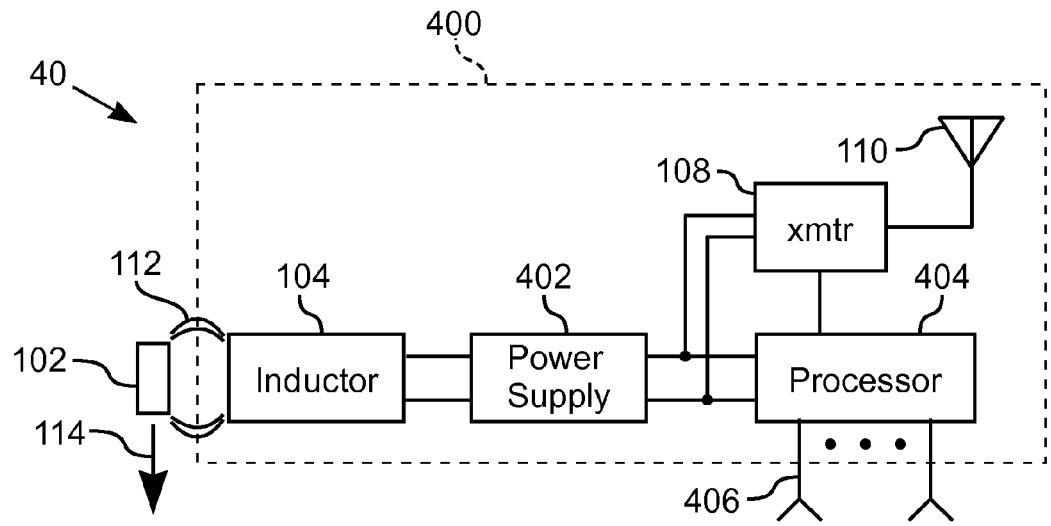
FIG. 4 is a functional block diagram of one embodiment of a multi-sensor transmitter system.

FIG. 4 illustrates a functional block diagram of one embodiment of a multi-sensor transmitter system 40. The multi-sensor transmitter system 40 includes a magnet 102 that interacts with a multi-sensor transmitter 400. The multi-sensor transmitter 400 includes an inductor 104 connected to a power supply 402 that is connected to a processor 404 and a transmitter 108. The inductor 104, when it interacts with the magnetic field 112 of the magnet 102, is a power source for the power supply 402. The power supply 402 provides power to the processor 404 and the transmitter 108. The processor 404 has a multitude of inputs 406, for example, inputs from sensors such as switches and transducers. The transmitter 108 has an input from the processor 404 and an output connected to an antenna 110.

As with the single sensor burst transmitter system 10, the magnet 102 moves repetitively relative to the inductor 104. In one embodiment, the magnet 102 is attached to a machine part that reciprocates or rotates such that the magnet 102 periodically moves past the inductor 104 in direction 114. The magnet 102 has a magnetic field 112 that periodically interacts with the inductor 104 to produce a pulse 302 in the inductor 104. In one embodiment, multiple magnets 102 are attached to the machine such that the inductor 104 senses the magnetic field 112 at a rate greater than once per cycle or revolution. In this way the multi-sensor transmitter 400 remains functional with machines that have a low reciprocating rate or a low number of revolutions per second.

The magnet 102 is dimensioned relative to the moving part of the machine such that the magnetic field 112 is substantially a point source that engages the inductor 104 for a shorter duration than the duration when the magnetic field 112 does not engage the inductor 104. That is, the interaction of the magnetic field 112 with the inductor 104 occurs briefly compared to the long dwell time with no interaction by the magnetic field 112. The interaction of the magnetic field 112 occurs during an interaction interval, which can be expressed in units of time or angular displacement. The dwell interval refers to the time or angular displacement where the magnetic field 112 does not interact with the inductor 104. For those embodiments where a magnet 102 is attached to a moving component of a machine, the magnet 102 will be substantially smaller than the moving component in order to minimize the mass added to the moving component and to minimize any unbalancing effect from the addition of the magnet 102. Typically, the ratio of the interaction interval to the dwell interval will be about 1:10 or less. For example, in one embodiment, the magnet 102 is cylindrical and less than ½ inch in diameter. The magnet 102 is attached to a rotating pulley that is six inches in diameter. In this example the interaction interval is approximately 10 degrees or less and the dwell interval is approximately 350 degrees or more, which results in the ratio of the interaction interval to the dwell interval of 10:350.

The processor 404 includes one or more inputs 406. The processor 404 outputs a signal to the transmitter 108 that includes an identifier and data. The identifier uniquely identifies the multi-sensor transmitter 400 for the embodiment where several transmitters 400 are used concurrently with overlapping range. In this way a receiver is able to identify the transmitter 400 and its corresponding data. The data corresponds to the inputs 406 to the processor 404.

As used herein, the processor 404 should be broadly construed to mean any computer or component thereof that executes software. The processor 404 includes a memory medium that stores software, a processing unit that executes the software, and input/output (I/O) units for communicating with external devices. Those skilled in the art will recognize that the memory medium associated with the processor 404 can be either internal or external to the processing unit of the processor without departing from the scope and spirit of the present invention.

In one embodiment the processor 404 is a general purpose computer, in another embodiment, it is a specialized device for implementing the functions of the invention. Those skilled in the art will recognize that the processor 404 includes an input component, an output component, a storage component, and a processing component. The input component receives input from external devices, such as the switches, sensors, and instruments that can be connected to the inputs 406. The output component sends output to external devices, such as the transmitter 108. The storage component stores data and program code. In one embodiment, the storage component includes random access memory. In another embodiment, the storage component includes non-volatile memory, such as floppy disks, hard disks, and writeable optical disks. The processing component executes the instructions included in the software and routines.

When multiple multi-sensor transmitter systems 40 are used within range of a single receiver, the transmitters 108 are configured to minimize or reduce interference. For example, in one embodiment, each transmitter 108 operates at a specific frequency or channel different from other transmitters 108. In another embodiment, the multiple transmitters 108 operate on the same frequency and the received signals are differentiated by the identifier sent by the transmitter 400. Because the signal has a short duration compared to the time between transmitted signals, collisions are rare. In case of a collision of signals from two transmitters 400, the next set of transmitted signals should not collide because the difference in the rotational speed of the magnet 102 is sufficiently different to cause the transmitters 400 to transmit at different times, assuming the transmission rate is tied to the rotational speed of the magnet 102.

Figure 5:
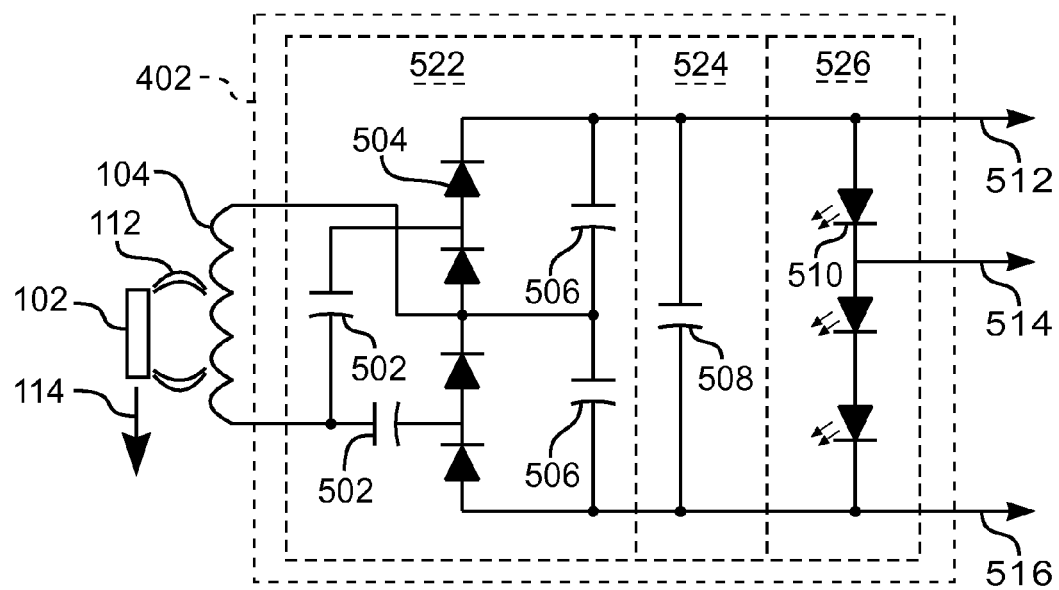
FIG. 5 is a schematic diagram of one embodiment of a power supply.

FIG. 5 illustrates a simplified schematic diagram of one embodiment of a power supply 402. The power supply 402 includes an energy harvester, or voltage multiplier, 522, a storage circuit 524, and a voltage regulating circuit 526.

The magnet 102 moves periodically in a direction 114 that causes the magnet's flux 112 to induce a current in the inductor 104. The strength of the magnetic flux 112 and the speed of the magnet 102 as it moves past the inductor 104 influence the magnitude and shape of the induced current signal. In various embodiments, the voltage across the inductor 104 due to the induced current is selected by using a transformer or by adjusting the configuration of the inductor 104. In one embodiment, the inductor 104 has a length parallel to the magnet direction 114 that is sufficient to produce the desired power from the interaction of the inductor 104 with the magnetic field 112 of the magnet 102.

The inductor 104 is a coil that is positioned near where the magnet 102 moves. The leads of the inductor 104 are connected to the power supply 402, which has an energy harvester 522, a storage circuit 524, and a voltage regulating circuit 526. In the illustrated embodiment, the energy harvester 522 in the power supply 402 is a voltage multiplier. The voltage multiplier circuit 522 increases the voltage across the inductor 104 to a level suitable for use by the processor 404 and the transmitter 108. The voltage multiplier circuit 522 includes a network of capacitors 502, 506 and diodes 504 that has an output voltage 516, 512 that is greater than the input voltage of the inductor 104. The voltage multiplier circuit 522 charges the capacitor 508 in the storage circuit 524.

The storage unit 524 stores the energy from the inductor 104 at the output voltage 516, 512 of the voltage multiplier circuit 522. In the illustrated embodiment the storage unit 524 is a capacitor 508. The capacitor 508 has a voltage rating sufficient to accommodate the maximum voltage from the voltage multiplier circuit 522. The capacitor 508 has sufficient capacitance to store the energy from the periodic interactions of the magnet 102 with the inductor 104, considering the power needs of the processor 404 and the transmitter 108.

The capacitance of the capacitor 508 affects the power storage capability and the start up time before such capacity is available. A capacitor 508 with high capacitance, for example, 0.33 F, requires several minutes from a cold start before being fully charged by the interaction of the magnetic field 112 with the inductor 104. Once charged, the capacitor 508 is able to provide power for substantial periods and/or power levels. A capacitor 508 with lower capacitance, for example, 0.022 F, is smaller in size, quicker to provide power after a cold start, and provides power for shorter periods and/or at lower power levels.

The voltage regulating circuit 526 in the illustrated embodiment includes a series of light emitting diodes (LEDs) 410. The LEDs 410, across the storage capacitor 508, serve to regulate the voltage output of the power supply 402. Red LEDs have a forward voltage of between 1.6 and 2.0 volts, depending upon the doping of the LED. For example, an output voltage of approximately 5 volts can be obtained with three LEDs between the ground 516 and the second output 512. An output voltage of approximately 3.2 volts can be obtained with two LEDs between the ground 516 and the first output 514. Until the output capacitor 508 is charged, the output voltages 512, 514 will be less than the voltage drop across the LEDs 510. The forward current through the LEDs 510 is limited because the current from the inductor 104 and the voltage multiplier circuit is limited. Another embodiment of the voltage regulating circuit 526 uses a Zener diode to control the output voltage 512, 514. In various embodiments, one or both of the outputs 512, 514 are used, based on the needs of the processor 404 and transmitter 108.

Upon first starting up, the power supply 402 has a zero output voltage. As the magnet 102 interacts with the inductor 104, the voltage multiplier circuit 522 charges the capacitor 508 in the storage unit 524 to the sum of the forward voltages of the diodes 510 in the voltage regulator circuit 526. The voltage regulator circuit 526 maintains a relatively constant voltage until current is drawn through the power supply 402. The voltage output 512, 514 remains somewhat constant until the output current level increases to the level where the capacity of the inductor 104 and voltage multiplier circuit 522 to keep the storage unit 524 charged is exceeded. The output voltage 512, 514 then falls. With an increasing load, that is, with a decreasing load impedance, when the output current level reaches a level where the magnet-inductor 102, 104 interaction cannot supply the full energy requirement, the output voltage 512, 514 drops, as does the current. The output voltage 512, 514 recovers only when the load decreases, that is, when the load impedance increases.

FIG. 5 illustrates a simplified schematic of one embodiment of a power supply 402. The simplified schematic does not illustrate various connections and components that may be required to accommodate specific components selected and/or desired circuit specifications. For example, the number of capacitors 502, 506 and diodes 504 in the voltage multiplier circuit 522 depend upon the desired output voltage and power desired at the output 512, 514. In another example, the size of the capacitor 508 in the storage unit 524 will vary depending upon the desired start time (larger capacitance requires a greater charging time upon startup) and the power desired for the transmitter 108 (larger capacitance allows for greater energy storage).

Figure 6:
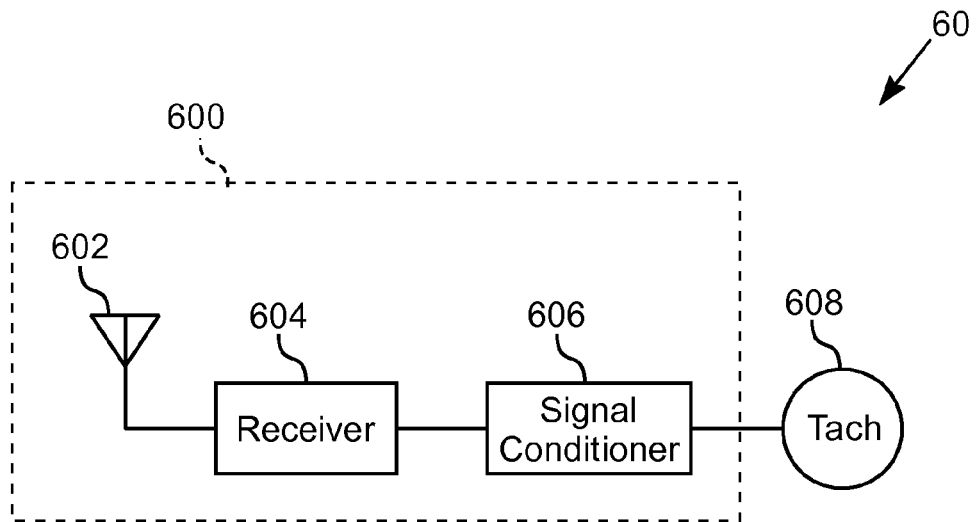
FIG. 6 is a functional block diagram of one embodiment of a wireless tachometer system.

FIG. 6 illustrates a functional block diagram of one embodiment of a wireless tachometer system 60. The wireless tachometer system 60 includes a tachometer receiver circuit 600 and a conventional tachometer 608. The tachometer receiver circuit 600 is responsive to a wireless signal from a transmitter 108 that sends pulses corresponding to a rotational speed of a device. In various embodiments, the transmitter 108 is one such as in a single sensor burst transmitter system 10, a multi-sensor transmitter system 40, a wireless system such as described in U.S. Pat. No. 8,035,498 (hereby incorporated by reference), or another wireless system that monitors a rotating device.

The tachometer receiver circuit 600 includes an antenna 602, a receiver 604, and a signal conditioner 606. The antenna 602 and receiver 604 detect the pulses corresponding to the rotational speed of a device desired to be monitored. The signal conditioner 606 is a circuit that converts the output of the receiver 604 into a signal that is compatible with a conventional tachometer 608. The wireless tachometer 60 monitors engine speed in a vehicle with a wireless connection between the sending unit and the wireless tachometer 60.

Typically, vehicles operate with a voltage of 12 Vdc. Wireless receivers 604 provide an analog output signal at half the supply voltage because the receiver output is an ac signal that, at most, fluctuates peak-to-peak between −6 and +6 volts, which is a range of 12 volts but with a maximum voltage of half of the operating voltage. The nominal maximum output of 6 volts for the receiver 604 is reduced further because of the level of the wireless signal fluctuates under normal conditions and receivers 608 are not intended to be operated at maximum gain for long term use. Accordingly, the conventional receiver 604 operating at a 12 volt rail voltage has an output substantially less than 6 volts. For example, a 10 db reduction from maximum, which is not normally considered a substantial reduction, results in an output level of 0.6 volts, which is insufficient to drive a conventional tachometer 608.

Conventional tachometers 608 require an input signal of 12 Vdc pulses because the conventional tachometer 608 is configured to be connected directly to the vehicle's coil or a tach output on an electronic ignition. The output of conventional receivers 604 are not compatible with the input of conventional tachometers 608. To correct the mismatch of voltage levels, a signal conditioner 606 matches the output of the conventional receiver 604 to the input of the conventional tachometer 608. Without the signal conditioner 606, the conventional tachometer 608 cannot provide a reliable indication with only the output of the conventional receiver 604.

In one embodiment, the wireless tachometer system 60 functions with a wireless input corresponding to a signal with two pulses per revolution and with the conventional automotive tachometer 608 configured with a setting corresponding to a 6 cylinder engine. The two pulses received for the wireless input correspond to a wireless transmitter sensing two magnets on the rotating member for one revolution. For those conventional automotive tachometers 608 that include a pulse per revolution (PPR) setting, the tachometer PPR setting is adjusted to correspond to the number of magnets 102 used.

Figure 7:
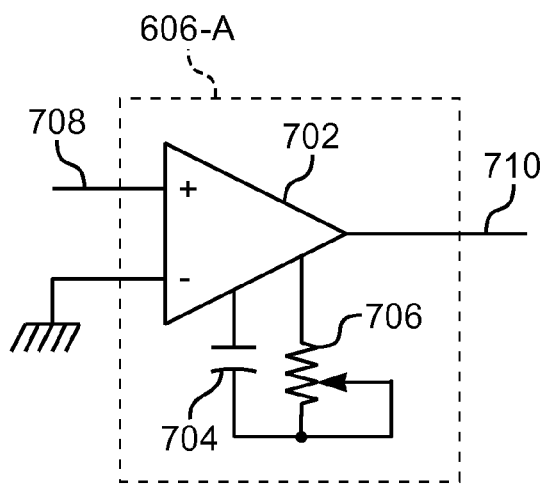
FIG. 7 is a schematic diagram for one embodiment of a signal conditioner.

FIG. 7 illustrates a schematic diagram for one embodiment of a signal conditioner 606-A for a wireless tachometer system 60. In the illustrated embodiment, an operational amplifier (op amp) 702 conditions the output signal 708 from the receiver 604 into a signal that is compatible with the tachometer 608. The capacitor 704 and variable resistor 706 are connected across the gain connections of the op amp 702 to control the level of the output 710.

In one such embodiment, the op amp 702 is an LM386, the capacitor 704 is 10 µF, and the resistor 706 is 10K ohms. In another embodiment, the op amp 702 is an LM4861 and the resistor 706 is not used. The input 708 to the signal conditioner 606-A is the low voltage output of the receiver 604. That is, the input 708 to the signal conditioner 606-A is at a nominal maximum of 6 volts. The gain of the signal conditioner 606-A is such that the output 710 is at a nominal 12 Vdc, which is sufficient to trigger the conventional automotive tachometer 608 reliably. In one such embodiment, the operational amplifier functions as a comparator with the gain set to minimize overdriving the operational amplifier while avoiding saturation.

Figure 8:
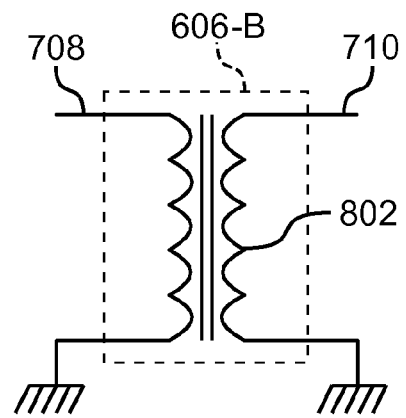
FIG. 8 is a schematic diagram for another embodiment of a signal conditioner.

FIG. 8 illustrates a schematic diagram for another embodiment of a signal conditioner 606-B. In the illustrated embodiment, a step up transformer 802 is used to convert the input 708 to the output 710. In one such embodiment, the transformer 802 is a step up transformer with a turns ratio of 3:1 or greater. In one such embodiment, the transformer 802 has a turns ratio of at least 5:1.

The input 708 to the signal conditioner 606-B is the low voltage output of the receiver 604, which is at a nominal maximum of 6 volts. The ratio of the transformer 802 is such that the output 710 is at a nominal 12 Vdc, which is sufficient to trigger the conventional automotive tachometer 608 reliably.

The output of the conventional receiver 604 is an alternating current (ac) signal. The transformer 802 steps up the receiver output voltage to a level that ensures reliable operation of the conventional tachometer 608. In one such embodiment, the gain of the receiver 604 is set or adjusted so that the output of the transformer 802 is at or near the operating voltage of the vehicle. In another such embodiment, the turns ratio of the transformer 802 is selected such that the output of the transformer 802 is at or near the operating voltage of the vehicle considering the output of the receiver 604. For installations where the transmitted signal strength is fixed and with a receiver 604 having a fixed gain, the transformer ratio is selected to provide an output that is greater than the minimum voltage requirement of the tachometer 608 and less than the saturation or maximum voltage of the tachometer 608.

FIGS. 7 and 8 illustrate a simplified schematics of the signal conditioners 606. The simplified schematics do not illustrate various connections that may be required to accommodate specific components selected, for example, voltage and/or current limiters.

The wireless tachometer system 60 includes various functions.

The function of sending a wireless signal is implemented, in one embodiment, by the transmitter 108 in a single sensor burst transmitter system 10. In another embodiment, the function of sending a wireless signal is implemented by the transmitter 108 in a multi-sensor transmitter system 40.

The function of receiving a wireless signal is implemented, in one embodiment, by the receiver 604 in the tachometer receiver circuit 600. The receiver 604 has an output that is less than one-half of the operating voltage of the wireless tachometer system 60

The function of converting the receiver output to the tachometer input is implemented, in one embodiment, by the signal conditioner 606, which converts the low voltage output of the receiver 604 to the level of the operating voltage required by the conventional tachometer 608. In one such embodiment, the function of converting is performed by an amplifier 606-A. In another such embodiment, the function of converting is performed by a step up transformer 606-B.

From the foregoing description, it will be recognized by those skilled in the art that a wireless tachometer system 60 has been provided. The wireless tachometer system 60 has a minimal parts count, requires no external wiring to a sensor, and has a low cost of installation and maintenance.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for receiving a wireless signal and driving a conventional tachometer, said apparatus comprising:
a receiver responsive to the wireless signal, said wireless signal including a series of pulses corresponding to a rotational speed of a device, said receiver having a receiver output with a receiver output level corresponding to a signal level of said wireless signal, said receiver output level limited to an alternating current peak-to-peak voltage of one half of an operating voltage of said receiver; and
a signal conditioner connected to said output of said receiver, said signal conditioner having a conditioned output with a conditioned output level substantially equal to said operating voltage of said receiver wherein said conditioned output is sufficient to drive a tachometer, said signal conditioner including one of an amplifier or a transformer wherein said amplifier has a gain sufficient to drive said conditioned output of said amplifier to an output level substantially equal to said operating voltage of said receiver, said transformer has a turns ratio sufficient to produce a conditioned output level substantially equal to said operating voltage of said receiver, and said transformer is connected as a step up transformer.

2. The apparatus of claim 1 further including said tachometer connected to said conditioned output of said signal conditioner, said tachometer operating with an input level substantially equal to said operating voltage of said receiver.

3. The apparatus of claim 1 wherein said amplifier is an operational amplifier with said receiver output connected to a non-inverted input of said operational amplifier.

4. The apparatus of claim 1 wherein said turns ratio of said transformer is at least 3:1.

5. The apparatus of claim 1 further including a transmitter configured to send said wireless signal to said receiver.

6. An apparatus for receiving a wireless signal corresponding to a rotational speed of a device and driving a conventional tachometer, said apparatus comprising:
a receiver responsive to the wireless signal, said receiver having an operating voltage, said receiver having an output varying with a maximum voltage of one half of said operating voltage of said receiver; and
a signal conditioner having an input connected to said output of said receiver, said signal conditioner having an output compatible with a tachometer; said signal conditioner including an amplifier, and said amplifier having a gain sufficient to drive said output of said signal conditioner to an output level substantially equal to said operating voltage of said receiver.

7. The apparatus of claim 6 further including said tachometer connected to said output of said signal conditioner, said tachometer operating with an input level substantially equal to said operating voltage of said receiver.

8. The apparatus of claim 6 wherein said amplifier is an operational amplifier with said output of said receiver connected to a non-inverted input of said operational amplifier.

9. The apparatus of claim 6 further including a transmitter configured to send the wireless signal to said receiver.

10. An apparatus for driving a conventional tachometer with a wireless signal, said apparatus comprising:
a transmitter configured to send the wireless signal, said wireless signal including a series of pulses corresponding to a rotational speed of a device;
a receiver responsive to the wireless signal, said receiver having an operating voltage, said receiver having an output varying with a maximum voltage no more than one half of said operating voltage of said receiver; and
a signal conditioner connected to said output of said receiver, said signal conditioner having an output level substantially equal to said operating voltage of said receiver, and said signal conditioner being a step up transformer with a turns ratio sufficient to produce said output level of said signal conditioner.

11. The apparatus of claim 10 further including said tachometer connected to said output of said signal conditioner, said tachometer operating with an input level substantially equal to said operating voltage of said receiver.

12. The apparatus of claim 10 wherein said turns ratio of said step up transformer is at least 3:1.

13. An apparatus for receiving a wireless signal corresponding to a rotational speed of a device and driving a conventional tachometer, said apparatus comprising:

a receiver responsive to the wireless signal, said receiver having an operating voltage, said receiver having an output varying with a maximum voltage of one half of said operating voltage of said receiver; and a signal conditioner having an input connected to said output of said receiver, said signal conditioner having an output compatible with a tachometer; said signal conditioner being a transformer with a turns ratio sufficient to produce an output level substantially equal to said operating voltage of said receiver, and said transformer is connected as a step up transformer.

14. The apparatus of claim 13 wherein said turns ratio of said transformer is at least 3:1.

15. The apparatus of claim 13 further including a transmitter configured to send the wireless signal to said receiver.

16. An apparatus for driving a conventional tachometer with a wireless signal, said apparatus comprising:

a transmitter configured to send the wireless signal, said wireless signal including a series of pulses corresponding to a rotational speed of a device;

a receiver responsive to the wireless signal, said receiver having an operating voltage, said receiver having an output varying with a maximum voltage no more than one half of said operating voltage of said receiver; and a signal conditioner connected to said output of said receiver, said signal conditioner having an output level substantially equal to said operating voltage of said receiver, signal conditioner including an amplifier, and said amplifier having a gain sufficient to produce said output level of said signal conditioner.

17. The apparatus of claim 16 wherein said amplifier is an operational amplifier with said receiver output connected to a non-inverted input of said operational amplifier.

* * * * *